C. A. OEHL.
LOZENGE MACHINE.
No. 99,937. Patented Feb. 15, 1870.
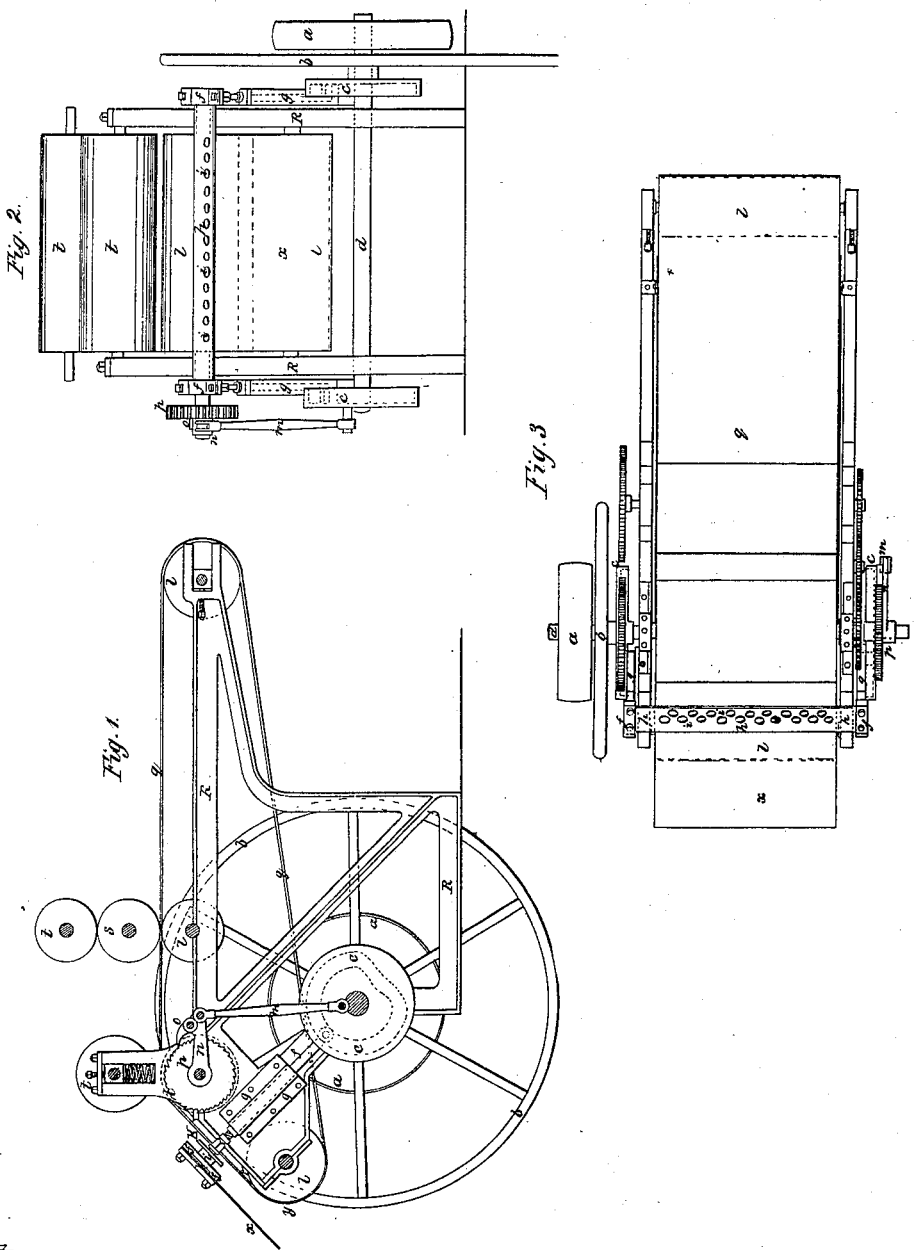
Witnesses:
J. Clyde Sullivan
Harry Taleman
Inventor:
Charles A. Oehl
by Becsey & Renaud attys

United States Patent Office.

CHARLES A. OEHL, OF PORTSMOUTH, NEW HAMPSHIRE.

Letters Patent No. 99,937, dated February 15, 1870.

IMPROVED LOZENGE-MACHINE.

The Schedule referred to in these Letters Patent and making part of the same.

*To all whom it may concern:*

Be it known that I, CHARLES A. OEHL, of the city of Portsmouth, in the county of Rockingham, and State of New Hampshire, have invented certain new and useful Improvements in Lozenge-Machines; and I do hereby declare the following to be a full and exact description of the same, reference being had to the accompanying drawings, of which—

Figure 1 is a section.
Figure 2 is a front view.
Figure 3 is a "top" or bird's-eye view.

This invention consists of a machine containing a combination of devices, by means of which lozenge-dough or paste is printed upon, and carried forward without stoppage on an endless apron (passing over rollers) beneath a perforated cutter, which stamps the lozenges from the dough or paste. The printed lozenges rising through the perforations in the cutter, fall over an inclined plane or trough into a vessel prepared for their reception, while the wastage from the cutter continues its transit with the endless apron until it falls into a reservoir, whence it is taken to be re-kneaded with the rest of the paste or dough.

To enable others skilled in the art to understand and use my invention, I will now proceed to describe the manner in which the same is or may be carried into effect.

By reference to the accompanying drawings it will be seen that—

R is a frame-work, holding the machinery *in situ*.
$a$ is a pulley, to which the power is applied.
$b$ is a fly-wheel.
$c$ is a cam, for working the cutter-bar $h$.
$d$ is the main shaft.
$l\ l$ are rollers, holding the endless apron $g$, which conveys the paste.
$m$ is a pitman, which operates the arm $n$ and pawl $o$, taking the ratchet $P$ to feed forward the paste or dough on the apron under the cutter-bar $h$ and cutters $i\ i$.
$k$ is a cleaning bar or plate, made of sheet metal, with holes, to clean the cutters.
$f$ is the yoke of the cutter-bar.
$u$ is a spring, to support the weight of the roller above it.
$s$ is a revolving printing-cylinder set with type, for the purpose of imprinting upon the sheet of dough, as it passes beneath it, whatever design or letters it is designed to represent upon the lozenges.

$t\ t$ are coloring rollers, so arranged that the types upon the printing-cylinder may receive from them the colors necessary to be imprinted on the lozenges.

Passing under the printing cylinder the sheet of dough moves on, and the lozenges being cut come out at the tops of the cutters, and slide down upon the inclined plate or trough $x$ to a board or apron provided for their reception, while the waste or remnants of paste fall down to $y$, and are carried back to be incorporated with the mass of uncut paste.

Having thus described the various parts of this machine, I will now explain its operation.

The prepared paste or dough is placed upon the apron $g$, at its highest end, which carries it forward beneath the printing-cylinder $s$; this, revolving its types in contact with the ink or color-rollers $t\ t$, imprints upon the sheet of dough whatever lettering, border, or design the manufactured lozenges are designed to bear. The printed sheet of paste continues its passage, with the endless apron, between the cutter-bar $h$ and the cutters $i\ i$, which stamp it into the proper size and shape. The cut lozenges are pushed up by their successors from beneath through the openings at $i\ i$, and pass down the inclined plane $x$ to their proper receptacle, while the wastage continues its journey with the endless apron to $y$, where it falls into a reservoir.

What I claim as new, and desire to secure by Letters Patent, is—

1. In a machine for cutting lozenges, crackers, &c., the combination of a printing-cylinder and inking-rollers, for the purpose of printing the design upon the sheet or paste, before passing it to the cutters.

2. The inclined plane or trough, in combination with the cutter-bar or cutters, as and for the purpose described.

3. The combination of the printing-cylinder with the inclined trough and cutters, so arranged and geared as to have consecutive and reciprocating motion, as and for the purpose set-forth.

4. The arrangement of the belt and inclined trough, whereby the separation of the lozenge and waste is effected.

C. A. OEHL.

Witnesses:
GEORGE WILLIAMSON,
CHARLES BERCHLING.